(12) United States Patent
Salkintzis

(10) Patent No.: US 12,245,023 B2
(45) Date of Patent: Mar. 4, 2025

(54) NOTIFICATION IN EAP PROCEDURE

(71) Applicant: Lenovo (Singapore) PTE. LTD., New Tech Park (SG)

(72) Inventor: Apostolis Salkintzis, Athens (GR)

(73) Assignee: Lenovo (Singapore) Pte. Ltd., New Tech Park, Singapore (SG)

(*) Notice: Subject to any disclaimer, the term of this patent is extended or adjusted under 35 U.S.C. 154(b) by 934 days.

(21) Appl. No.: 17/279,063

(22) PCT Filed: Apr. 6, 2020

(86) PCT No.: PCT/EP2020/059792
§ 371 (c)(1),
(2) Date: Mar. 23, 2021

(87) PCT Pub. No.: WO2021/204352
PCT Pub. Date: Oct. 14, 2021

(65) Prior Publication Data
US 2022/0116769 A1 Apr. 14, 2022

(51) Int. Cl.
*H04W 76/10* (2018.01)
*H04L 9/40* (2022.01)
(Continued)

(52) U.S. Cl.
CPC ............ *H04W 12/03* (2021.01); *H04L 63/08* (2013.01); *H04W 48/18* (2013.01); *H04W 76/10* (2018.02)

(58) Field of Classification Search
CPC ..... H04W 12/03; H04W 48/18; H04W 76/10; H04W 12/037; H04W 12/06; H04W 88/14; H04L 63/08; H04L 63/162
See application file for complete search history.

(56) References Cited

U.S. PATENT DOCUMENTS

| 2004/0166874 A1* | 8/2004 | Asokan | H04W 8/12 455/433 |
| 2010/0142499 A1* | 6/2010 | Zhang | H04W 76/50 370/352 |

(Continued)

FOREIGN PATENT DOCUMENTS

| WO | WO-2018206081 A1 * | 11/2018 | ............ H04W 12/06 |
| WO | 2020/064107 A1 | 4/2020 | |

OTHER PUBLICATIONS

3rd Generation Partnership Project; Technical Specification Group Services and System Aspects; Study on the Wireless and Wireline Convergence for the 5G system architecture (Release 16) (Year: 2018).*

(Continued)

*Primary Examiner* — Syed A Zaidi
(74) *Attorney, Agent, or Firm* — Kunzler Bean & Adamson

(57) ABSTRACT

Apparatuses, methods, and systems are disclosed for supporting a notification procedure during 5G registration over a non-3GPP access network. One apparatus includes a transceiver that communicates with a mobile communication network ("MCN") via a trusted non-3GPP access network ("TNAN") and a processor that receives a message that starts an EAP session with an access gateway in the TNAN. Here, the EAP session facilitates the establishment of a NAS signaling connection between the apparatus and the MCN and to encapsulate NAS messages exchanged between the apparatus and an AMF in the MCN. The processor receives an EAP notification request from the access gateway before the EAP session is completed. Here, the EAP notification request including at least one access parameter. The processor sends an EAP notification response and completes the EAP session.

20 Claims, 9 Drawing Sheets

(51) Int. Cl.
*H04W 12/03* (2021.01)
*H04W 48/18* (2009.01)

(56) References Cited

U.S. PATENT DOCUMENTS

| | | | | |
|---|---|---|---|---|
| 2013/0007858 | A1* | 1/2013 | Shah | H04W 12/0431 |
| | | | | 726/6 |
| 2014/0185603 | A1* | 7/2014 | Kaippallimalil | H04L 63/162 |
| | | | | 370/338 |
| 2019/0335330 | A1* | 10/2019 | Salkintzis | H04W 12/06 |
| 2023/0080836 | A1* | 3/2023 | Vahidi Mazinani | H04W 60/06 |
| | | | | 455/435.1 |

OTHER PUBLICATIONS

NPL Search Terms (Year: 2024).*
PCT/EP2020/059792, "Notification of Transmittal of the International Search Report and the Written Opinion of the International Searching authority, or the Declaration", International Searching Authority, Nov. 25, 2020, pp. 1-12.

3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.

3GPP, "3rd Generation Partnership Project; Technical Specification Group Services and System Aspects; Procedures for the 5G System (5GS); Stage 2 (Release 16)", 3GPP TS 23.502 V16.7.1, Jan. 2021, pp. 1-603.

3GPP, "3rd Generation Partnership Project; Technical Specification Group Services and System Aspects; Study on the Wireless and Wireline Convergence for the 5G system architecture (Release 16)", 3GPP TR 23.716 V16.0.0, Dec. 2018, pp. 1-184.

3GPP, "3rd Generation Partnership Project; Technical Specification Group Core Network and Terminals; Access to the 3GPP 5G Core Network (5GCN) via Non-3GPP Access Networks (N3AN); Stage 3 (Release 17)", 3GPP TS 24.502 V17.1.0, Dec. 2020, pp. 1-89.

3GPP, "3rd Generation Partnership Project; Technical Specification Group Services and System Aspects; Security architecture and procedures for 5G system (Release 17)", 3GPP TS 33.501 V17.0.0, Dec. 2020, pp. 1-253.

* cited by examiner

NOTIFICATION IN EAP PROCEDURE

The subject matter disclosed herein relates generally to supporting a notification procedure during 5G registration over a non-3GPP access network.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Point Name ("APN"), Access Stratum ("AS"), Access Network Information ("ANI"), Application Programing Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), User Location Information ("ULI"), Wireless Local Area Network ("WLAN"), and Worldwide Interoperability for Microwave Access ("WiMAX").

In certain embodiments, a UE that supports the 5G NAS protocol may register with a 5G core ("5GC") network via a trusted non-3GPP access network ("TNAN"). The registration procedure assumes that the AMF initiates a Security Mode Control ("SMC") exchange with the UE and that the TNGF IP address is provided to the UE in the context of this exchange. Note that the TNGF IP address is needed in the UE in order to establish a secure IP connection (also called NWt connection) with the TNGF after the UE has successfully connected to the trusted non-3GPP access network and after it has obtained IP configuration.

BRIEF SUMMARY

Methods for supporting a notification procedure during 5G registration over a non-3GPP access network are disclosed. Apparatuses and systems also perform the functions of the methods.

One method of a TNGF, e.g., for supporting a notification procedure during 5G registration over a non-3GPP access network, includes starting an EAP session with a UE. Here, the EAP session facilitates the establishment of a NAS signaling connection between the UE and the mobile communication network. The EAP session is used to encapsulate NAS messages exchanged between the UE and an AMF in the mobile communication network. The method includes receiving a request from the AMF. Here, the request indicates that the EAP session is to be completed. The method includes determining whether the UE is to receive at least one access parameter before the EAP session is completed. The method includes sending an EAP notification request to the UE in response to determining that the UE is to receive the at least one access parameter before the EAP session is completed. Here, the EAP notification request includes the at least one access parameter. The method includes receiving an EAP notification response from the UE. The method includes completing (i.e., ending or closing) the EAP session.

One method of a UE, e.g., for supporting a notification procedure during 5G registration over a non-3GPP access network, includes receiving a message that starts an EAP session with an access gateway in a TNAN. Here, the EAP session facilitates the establishment of a NAS signaling connection between the UE and the mobile communication network. The EAP session is used to encapsulate NAS messages exchanged between the UE and an AMF in the mobile communication network. The method includes receiving an EAP notification request from the access gateway before the EAP session is completed. Here, the EAP notification request includes at least one access parameter. The method includes sending an EAP notification response. The method includes completing (i.e., ending or closing) the EAP session.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
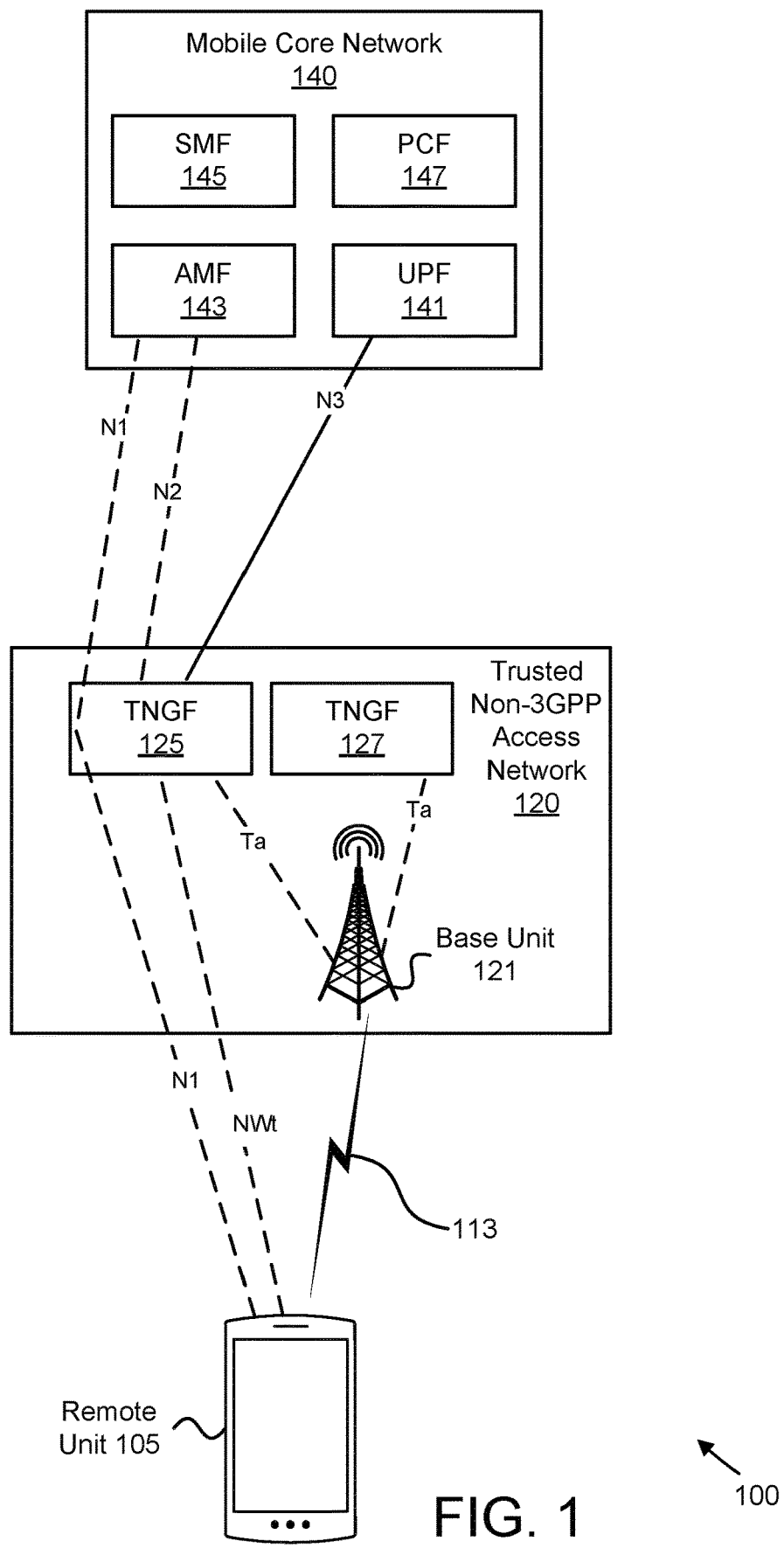
FIG. 1 is a diagram illustrating one embodiment of a wireless communication system for supporting a notification procedure during 5G registration over a non-3GPP access network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for supporting a notification procedure during 5G registration over a non-3GPP access network. As specified in the current 3GPP 5G specifications, a UE may connect to a 5G core in a PLMN via several types of, so-called, trusted non-3GPP access networks, all of them providing connectivity between the UE and the 5G system via a Trusted Non-3GPP Gateway Function ("TNGF"). Note that the TNGF may be deployed as part of the access network, thereby forming a Trusted Non-3GPP Access Network ("TNAN"). These access networks are deemed as trusted from the 5G core network point of view because they support secure signaling interfaces and interworking with the 5G core network. Such networks are deemed as non-3GPP access networks because they are based on technology not specified by 3GPP such as Wi-Fi access networks and wireline access networks, among others.

The current 3GPP specifications define how a UE that supports the 5G-NAS protocol (simply referred to as "UE" in this document) can register with a 5G core (5GC) network via a trusted non-3GPP access network. The overall procedure is described in TS 23.502, clause 4.12a.2.2, "Registration procedure for trusted non-3GPP access". This procedure assumes that the AMF initiates a Security Mode Control ("SMC") exchange with the UE (see steps 9a-9d) and that the TNGF IP address is provided to the UE (in step 9b) in the context of this exchange. Note that the TNGF IP address is needed in the UE in order to establish an NWt connection with the TNGF (in step 13), after the UE has successfully connected to the trusted non-3GPP access network and after it has obtained IP configuration.

However, providing the TNGF IP address to the UE during the SMC exchange features the following issues:

Firstly, in some scenarios, the AMF does not need to initiate the SMC exchange with the UE during the registration procedure via trusted non-3GPP access. For example, if a UE has already registered with a 5GC via NG-RAN prior to accessing the TNAN, hence, a 5G-NAS security context has been created in the UE and its serving AMF, then the SMC exchange is not needed. The 5G-NAS security context contains information, such as cryptographic keys and algorithms, which are applied for cryptographically protecting the NAS messages exchanged between the UE and the AMF.

In the above scenario, the Registration Request message sent by the UE via the TNAN is integrity protected using the existing 5G-NAS security context in the UE, and the AMF validates its integrity using its own 5G-NAS security context. If the validation is successful, which indicates that the UE has a valid 5G-NAS security context, then the AMF may skip the authentication procedure and the SMC exchange for this UE.

It is also clear that, since the UE has a valid (and non-expired) 5G-NAS security context, there is no need for AMF to initiate an SMC exchange. After validating the integrity of the received Registration Request message, the AMF can immediately derive a TNGF key (as specified in TS 33.501) and can provide this key to the TNGF. In this scenario, the UE does not receive a TNGF IP address during the EAP-5G session and, thus, it cannot establish the NWt connection after completing the EAP-5G session. As a result, the 5G registration procedure via trusted non-3GPP access will fail. Note that the TNGF cannot send the TNGF IP address to the UE in the EAP-Success packet because this packet can include no parameters according to the EAP RFC 3748.

Secondly, even in other scenarios when the AMF decides to initiate the SMC exchange during the 5G registration via trusted non-3GPP access, providing the TNGF IP address to the UE during the SMC exchange (as currently specified in TS 23.502) is not feasible because the TNGF does not know when the AMF sends the SMC Command to the UE. This is because the TNGF transparently relays NAS messages between the UE and the AMF, without decoding and processing these NAS messages. Moreover, the TNGF providing the TNGF IP address to the UE at another opportunity (e.g., when it sends the first EAP/5G-NAS message to the UE) risks exposing the TNGF IP address to the UE before authentication, thus, any unauthenticated and/or malicious UE would be able to receive this IP address and to start attacks towards the TNGF.

Disclosed herein are procedures that enable the TNGF to send the TNGF IP address to the UE only after it receives an indication from the AMF that the EAP-5G can be successfully completed. More specifically, the present disclosure extends the EAP-5G protocol that operates between the UE and the TNGF during a 5G registration via trusted non-3GPP access, so that the TNGF can send "access parameters" (such as the TNGF IP address) to the UE after receiving an indication from AMF that the EAP-5G session can be successfully completed. An access parameter is any kind of parameter that the TNGF wishes to provide to the UE before the completion of an EAP-5G session (including a TNGF IP address) and can be sent to the UE with or without cryptographic protection. After sending the access parameters to the UE, the TNGF sends an EAP-Success packet to the UE to signal the successful completion of the EAP-5G session. The access parameters are provided to the UE when the AMF indicates to the TNGF that the EAP-5G session should be successfully completed. However, access parameters may also be provided to the UE as failure result indications, when the AMF indicates to the TNGF that the EAP-5G session should be unsuccessfully completed.

FIG. 1 depicts a wireless communication system 100 for supporting a notification procedure during 5G registration over a non-3GPP access network, according to embodiments of the disclosure. In one embodiment, the wireless communication system 100 includes at least one remote unit 105, at least one trusted non-3GPP access network ("TNAN") 120, and a mobile core network 140 in a PLMN. The TNAN 120 may be composed of at least one base unit 121. The remote unit 105 may communicate with the TNAN 120 using non-3GPP communication links 113, according to a radio access technology deployed by TNAN 120. Even though a specific number of remote units 105, base units 110, TNANs 120, and mobile core networks 140 are depicted in FIG. 1, one of skill in the art will recognize that any number of remote units 105, base units 110, TNANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the TNAN 120 via uplink ("UL") and downlink ("DL") communication signals. Furthermore, the UL and DL communication signals may be carried over the communication links 113. Note, that the TNAN 120 is an intermediate network that provide the remote units 105 with access to the mobile core network 140.

The base units 121 may serve a number of remote units 105 within a serving area, for example, a cell or a cell sector, via a communication link 113. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 121.

As noted above, the TNAN 120 supports secure signaling interfaces and interworking with the 5G core network. The TNAN includes at least one TNGF; in the depicted embodiment the TNAN 120 includes a first TNGF 125 and a second TNGF 127. In certain embodiments, the TNAN 120 supports a Tn interface between the TGNF in the TNAN 120.

The base units 121 may be distributed over a geographic region. In certain embodiments, a base unit 121 may also be referred to as a Trusted Non-3GPP Access Point ("TNAP"), an access terminal, an access point, a base, a base station, a relay node, a device, or by any other terminology used in the art. The base units 121 are generally part of a radio access network ("RAN"), such as the TNAN 120, that may include one or more controllers communicably coupled to one or more corresponding base units 121. These and other elements of radio access network are not illustrated but are well known generally by those having ordinary skill in the art. The base units 121 connect to the mobile core network 140 via the TNAN 120.

In some embodiments, the remote units 105 communicate with an application server (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the TNAN 120. In order to establish the PDU session, the remote unit 105 must be registered with the mobile core network.

In one embodiment, the mobile core network 140 is a 5G core ("5GC") or the evolved packet core ("EPC"), which may be coupled to a data network (such as the Internet and private data networks, among other data networks). A remote unit 105 may have a subscription or other account with the mobile core network 140. The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 141. The mobile core network 140 also includes multiple control plane functions including, but not limited to, an Access and Mobility Management Function ("AMF") 143, a Session Management Function ("SMF") 145, and a Policy Control Function ("PCF") 147. In certain embodiments, the mobile core network 140 may also include a Unified Data Management function ("UDM") 149, an Authentication Server Function ("AUSF"), a Network Repository Function ("NRF") (used by the various NFs to discover and communicate with each other over APIs), or other NFs defined for the 5G Core.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM. In another example, each network slice includes an AMF, an SMF and a UPF. Although specific numbers and types of network functions are depicted in FIG. 1, one of skill in the art will recognize that any number and type of network functions may be included in the mobile core network 140.

When a remote unit 105 attempts to register with the mobile core network 140 via the TNAN 120, the TNGF 125 may initiate an EAP-5G procedure for sending 5G-NAS messages between the remote unit 105 and the mobile core network 140 (e.g., the AMF 143). As discussed above, the network address (e.g., IP address) of the TNGF is needed to establish the NWt connection. In order to assure that the remote unit 105 receives the TNGF address before the EAP procedure ends, while protecting the TNGF address from exposure to unauthorized entities, the TNGF 123 sends the TNGF IP address to the remote unit 105 within access parameters only after it receives an indication from the AMF 143 that the EAP-5G procedure can be successfully completed, as described in further detail with reference to FIGS. 2A-2C and FIG. 3.

Figure 2A:
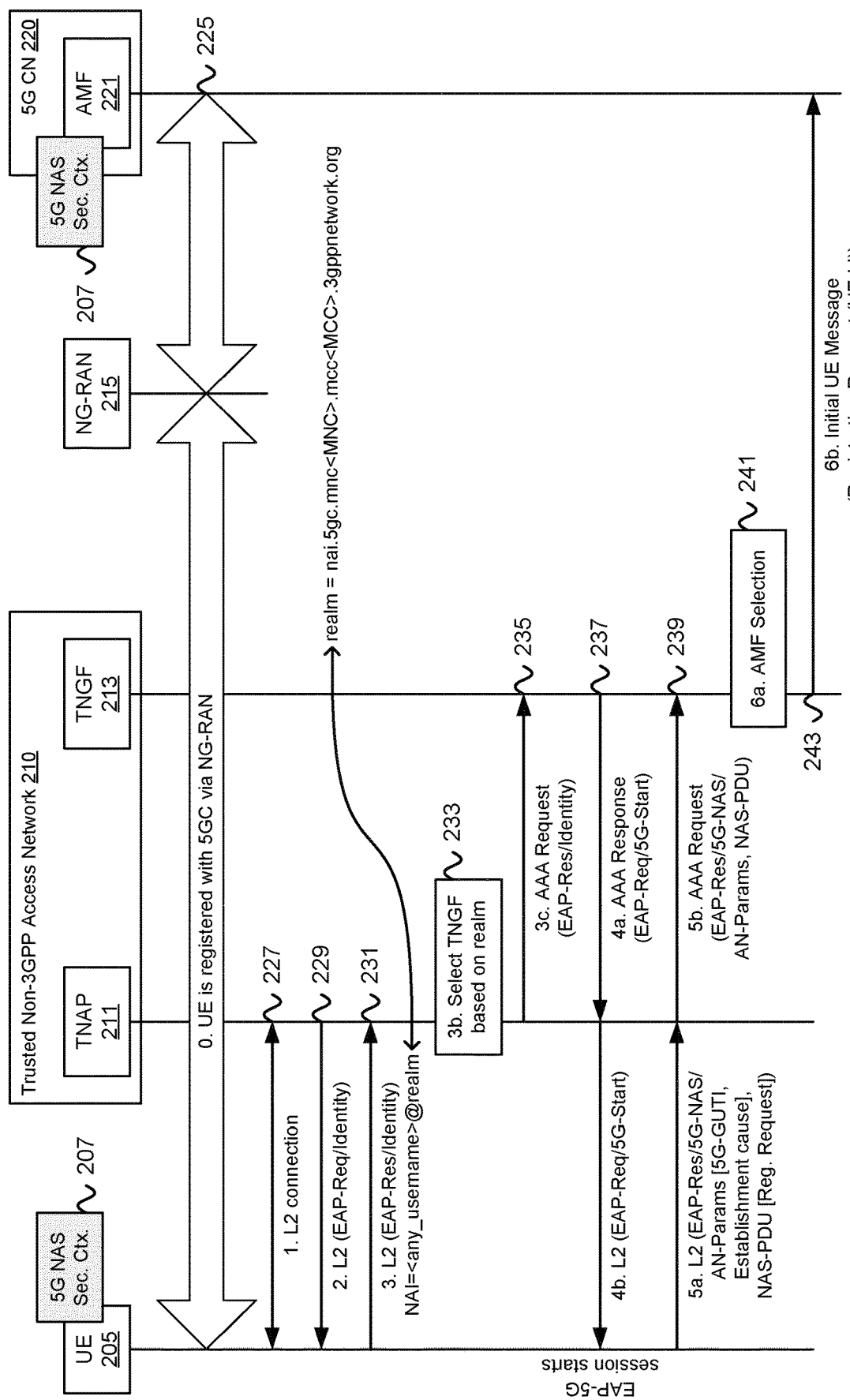
FIG. 2A is a signal flow diagram illustrating one embodiment of a notification procedure during 5G registration over a non-3GPP access network.
Figure 2B:
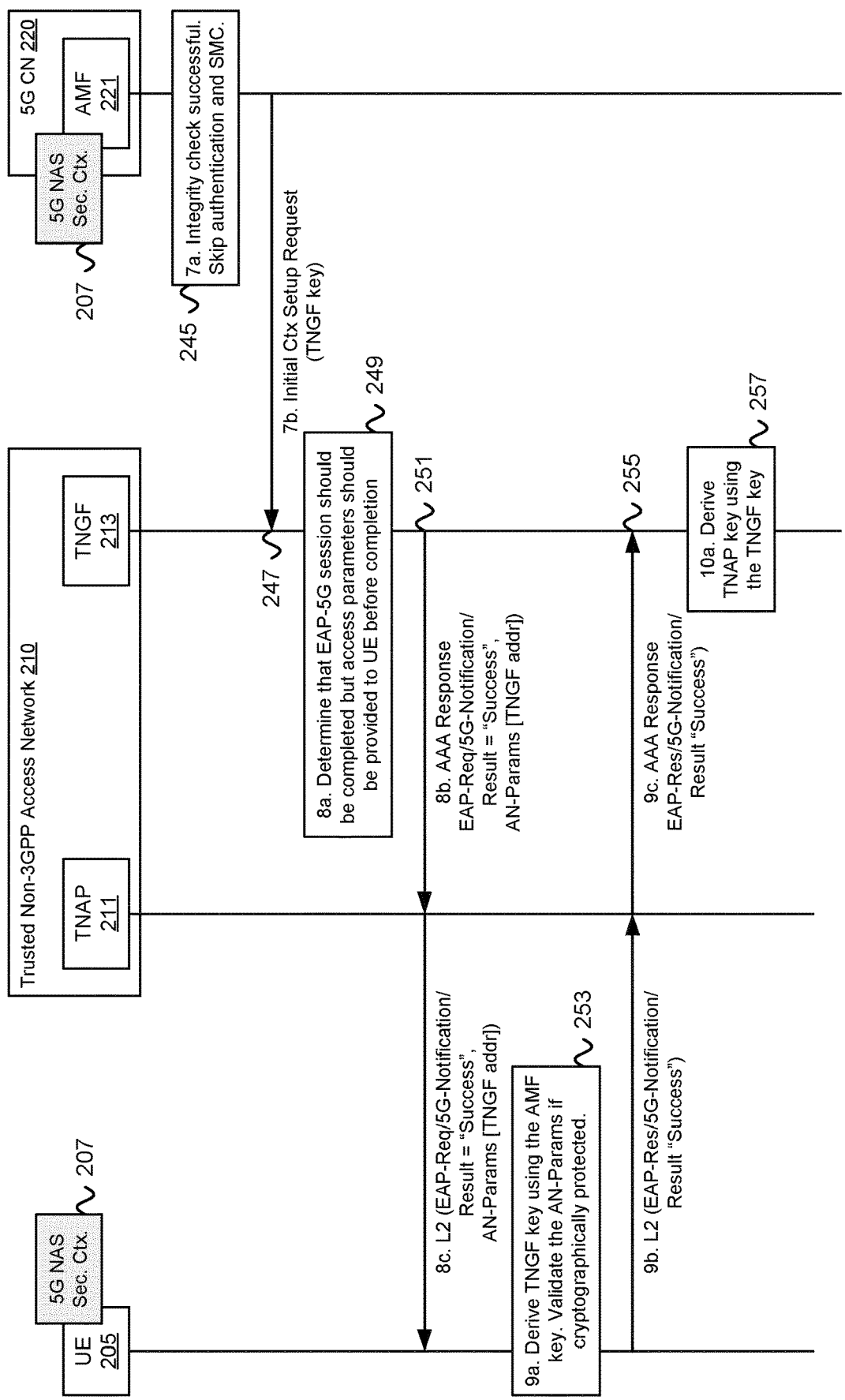
FIG. 2B is a continuation of the procedure depicted in FIG. 2A.
Figure 2C:
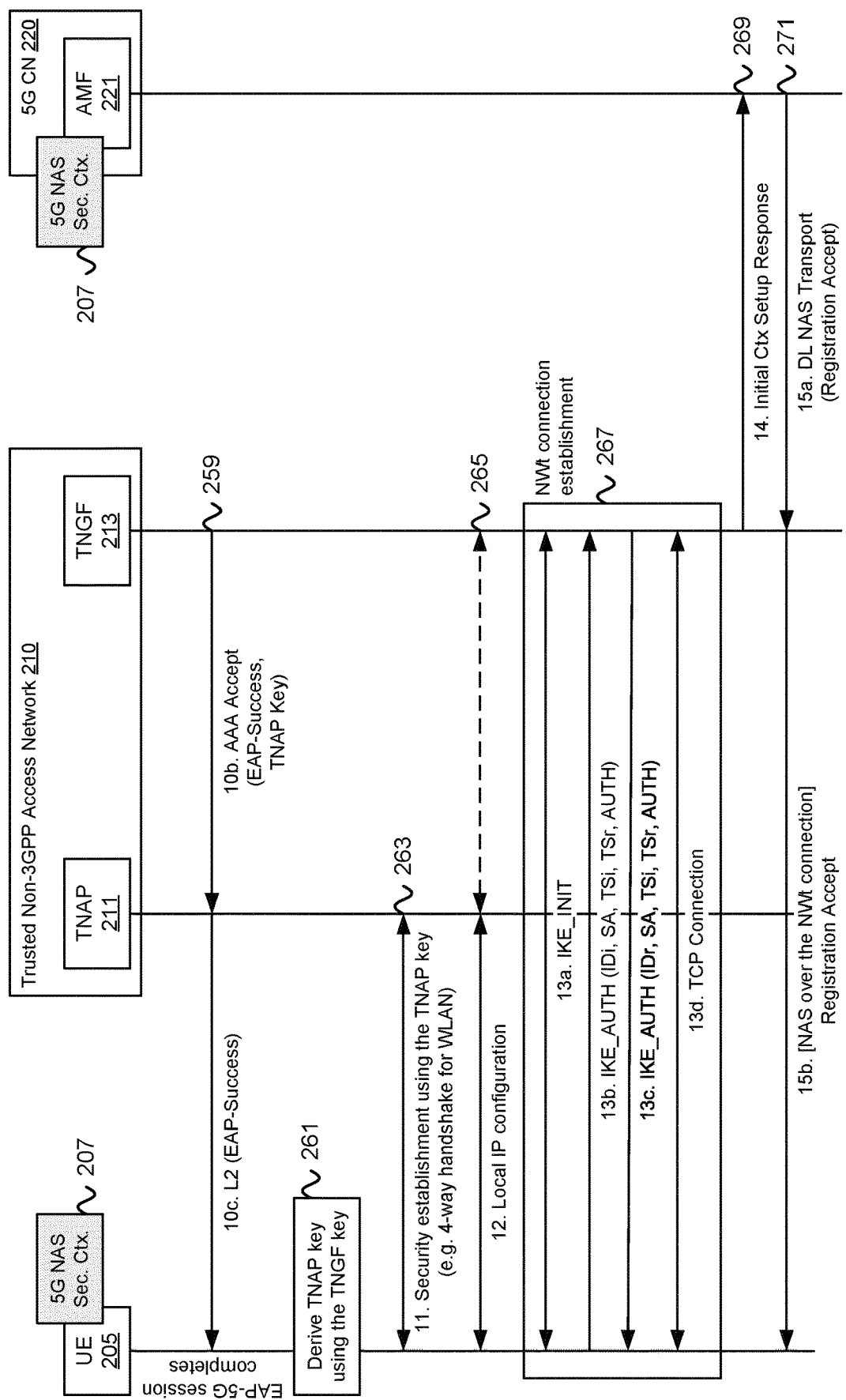
FIG. 2C is a continuation of the procedure depicted in FIG. 2B.

FIGS. 2A-2C depict a procedure 200 for supporting a notification procedure during 5G registration over a non-3GPP access network, according to embodiments of the disclosure. The procedure 200 involves the UE 205 (e.g., one embodiment of the remote unit 105), a TNGF 213 (e.g., one embodiment of the TNGF 123) in a TNAN 210 (e.g., one embodiment of the TNAN 120), an NG-RAN 215, and an AMF 221 (e.g., one embodiment of the AMF 143) in the 5G core network 220 (e.g., one embodiment of the mobile core network 140). The procedure 200 details signaling flow of a modified registration procedure for a scenario where a UE 205 initiates registration with the 5G core network 220 via a trusted non-3GPP access network. Similar steps take place in other scenarios, e.g., when the UE 205 attempts to perform a Service Request, instead of a Registration Request.

Referring to FIG. 2A, the procedure 200 begins at Step 0, as the UE 205 is registered with the 5G core network 220 via 3GPP access, e.g., via NG-RAN 215 (see messaging 225). During this first registration, a 5G-NAS security context 207 is created in the UE 205 and in the AMF 221 serving the UE 205. This security context 207 contains the cryptographic keys and algorithms that are to be applied for protecting the NAS messages exchanged between the UE 205 and the AMF 221.

At Step 1, the UE 205 decides to connect to the same 5G core network 220 via an available non-3GPP access network. The UE 205 discovers a non-3GPP access network supporting 5G connectivity (or "trusted" connectivity) to this 5GC, thus, it selects this "trusted" non-3GPP access network (here, TNAN 210) and initiates a registration procedure for trusted non-3GPP access, e.g., as specified in 3GPP TS 23.502, clause 4.12a.2.2, as modified herein. In the most typical case, the trusted non-3GPP access network is a WLAN access network complying with the IEEE 802.11 specification. First, the UE 205 establishes a Layer-2 (L2) connection with a Trusted Non-3GPP Access Point (TNAP) 211 in the trusted non-3GPP access network (see messaging 227). In the case of an IEEE 802.11 WLAN, this L2 connection corresponds to an 802.11 Association.

At Steps 2-3, an EAP procedure is initiated. EAP messages are encapsulated into Layer-2 packets, e.g., into IEEE 802.11/802.1x packets. The TNAP 211 requests the UE Identity and the UE 205 sends a Network Access Identifier ("NAI") as a response (see messaging 229, 231). The NAI provided by the UE 205 indicates that the UE 205 Requests "5G connectivity" to a specific PLMN, e.g., NAI="<any_username>@nai.5gc.mnc<MNC>.mcc<MCC>.3gppnetwork.org." This NAI triggers the TNAP 211 to select a TNGF (i.e., TNGF 213) and send an AAA Request to the selected TNGF 213 (see block 233, messaging 235). Between the TNAP 211 and the TNGF 213, each EAP packet is encapsulated into an AAA message.

Note that multiple TNGFs may be deployed in the TNAN 120, all of them providing access to the 5GC in the same PLMN. These TNGFs may support different Tracking Areas and network slices or may support the same Tracking Area and network slices. In the example embodiment shown in FIGS. 2A-2C, it is assumed that the selected TNGF 213 can support the network slices allowed by the 5G core network 220 for the UE 205, thus, there is no need to relocate this TNGF to another TNGF. However, in other embodiments, TNGF relocation may occur as part of the procedure 200, discussed in greater detail below.

At Step 4, after receiving the AAA request the TNGF 213 responds with an AAA response message, which includes an EAP-Request/5G-Start packet indicating to the UE 205 that an EAP-5G session starts and the UE 205 can start sending NAS messages encapsulated within EAP-5G packets (see messaging 237).

At Step 5, the UE 205 sends an EAP-Response/5G-NAS packet that contains Access Network parameters (AN-Params) and a Registration Request message (or a Service Request message) (see messaging 239). Note that the AN-Params sent by the UE 205 are different than the access parameters discussed above that are sent by a TNGF and include, e.g., the TNGF IP address.

Here, the AN-Params contain a UE identity (e.g., SUCI or 5G-GUTI), the Selected PLMN identity and an Establishment cause. Optionally, a Requested NSSAI may also be contained if the UE 205 does not operate in the default NSSAI Inclusion mode D (specified in 3GPP TS 23.502). The Establishment cause provides the reason for Requesting a signaling connection with the 5G core network 220. The TNAP 210 forwards the EAP-Response/5G-NAS packet to the TNGF 213 within an AAA Request message.

Note that because the UE 205 has already established a 5G-NAS security context 207 (in step 0), the Registration Request message is integrity protected by applying the cryptographic keys and algorithms in the 5G-NAS security context 207.

At Step 6, the TNGF 213 selects an AMF 221 in the 5G core network 220 of the selected PLMN based on the received AN-Params and local policy, e.g., as specified in 3GPP TS 23.501, clause 6.3.5 (see block 241). In turn, the TNGF 213 forwards the Registration Request (or the Service Request) received from the UE 205 to the selected AMF 221 within an N2 Initial UE 205 Message (see messaging 243). This message contains N2 parameters that include the Selected PLMN ID and the Establishment cause.

Continuing at FIG. 2B, at Step 7 the AMF 221 validates the integrity of the received Registration Request and confirms that the UE 205 has the right 5G NAS security context (see block 245). Therefore, the AMF 221 decides to skip the authentication procedure and the security mode control procedure. Subsequently, the AMF 221 sends an Initial Context Setup Request to the TNGF 213 in order to enable the completion of the EAP-5G session (see messaging 247). This message includes a TNGF key, which should be used for establishing secure communication in the TNAN 210.

In alternative embodiments, where the registration is to be relocated to another TNGF, the AMF 221 sends a TNGF Relocation Command (instead of the Initial Context Setup Request), which contains the TNGF key and the IP address of the other TNGF (i.e., the new TNGF to which the registration is relocated).

At Step 8, because the TNGF 213 received a TNGF key, the TNGF 213 determines that the EAP-5G session is to be completed successfully (see block 249). However, the TNGF 213 determines also that the UE 205 is to receive access parameters before the completion of the EAP-5G session, such as the IP address of TNGF 213 (TNGF address). Without the TNGF address, the UE 205 cannot establish later the NWt connection (in Step 13 at FIG. 2C) and hence the registration will fail.

Accordingly, the TNGF 213 sends an EAP-Request/5G-Notification packet to the UE 205 that contains one or more access parameters and may also contain a result indication (e.g., Success or Failure) that indicates whether the EAP-5G session is successful or not (see messaging 251).

If needed, one or more of the access parameters may be cryptographically protected by the TNGF 213 (e.g., encrypted or integrity protected) using the received TNGF key and, e.g., a pre-defined cryptographic algorithm. The cryptographic protection allows the encryption of sensitive access parameters and prevents unauthorized or malicious users from obtaining these parameters, e.g., by monitoring the traffic over the non-3GPP access air-interface. Note that the EAP-Request/5G-Notification packet is sent to the UE 205 before air-interface security is established between the UE 205 and TNAP 211 in step 11. Hence, the access parameters in this EAP-Request/5G-Notification packet can be monitored by unauthorized users if they are not protected.

Alternatively, instead of using a pre-defined cryptographic algorithm for the protection of access parameters, the UE 205 may indicate to the TNGF 213 a set of supported (one or more) cryptographic algorithms. For example, the EAP-Response/5G-NAS packet in step 5a may include these algorithms. In such embodiments, the TNGF 213 may select one of the supported algorithms and indicate to the UE 205 the selected cryptographic algorithm, e.g., in the EAP-Request/5G-Notification packet send in Step 8.

If in the previous step (i.e., step 7) the AMF 221 decided to reject the Registration Request from the UE 205, then (instead of the Initial Context Setup Request) the AMF 221 sends first a DL NAS Transport message to the TNGF 213 containing a Registration Reject message, which would be forward to the UE 205, and then sends a UE Context Release Command to the TNGF 213, which would be an indication that the EAP-5G session should be completed unsuccessfully.

This would trigger the TNGF 213 to send an EAP-Failure message to the UE 205. However, before sending the EAP-Failure (in step 10), the TNGF 213 may send an EAP-Request/5G-Notification packet to the UE 205 providing access parameters that explain the reason of failure and/or access parameters that can be used to reattempt the registration (e.g., when the TNGF 213 becomes overloaded).

At Step 9, the UE 205 derives the TNGF key using the AMF key that was created before during the prior authentication procedure (e.g., over 3GPP access) and, if any received access parameters are cryptographically protected, the UE 205 validates these parameters (see block 253). The UE 205 informs the TNGF 213 whether it successfully received the access parameters (see messaging 255). If the UE 205 successfully validates (i.e., decrypts) and accepts the received access parameters, then the UE 205 responds with an EAP-Response/5G-Notification packet indicating success (i.e., with Result="Success"). Note that if the UE 205 is unsuccessful in validating the received access parameters, then the UE 205 may respond with an EAP-Response/5G-Notification packet indicating failure (i.e., with Result="Failure").

At Step 10a, as a response to the EAP-Response/5G-Notification packet, the TNGF 213 derives (e.g., from TNGF key) the TNAP key, which is to be used to establish air-interface security with the UE 205 (see block 257).

Continuing on FIG. 2C, at Step 10b the TNGF 213 sends an EAP-Success packet to the TNAP 211 inside an AAA Accept message (see messaging 259). The AAA Accept includes the TNAP key (derived from TNGF key), which should be used to establish air-interface security with the UE 205. At Step 10c, the TNAP 211 sends the EAP-Success packet to the UE 205 (i.e., encapsulated in a Layer-2 packet), which concludes the EAP-5G session initiated in Step 4.

At Step 11, using the TNAP key (which is also derived by the UE 205 from the TNGF key, see block 261), the UE 205 and the TNAP 211 establish air-interface security (see messaging 263). In the case of an IEEE 802.11 WLAN, this corresponds to a 4-way handshake exchange. Subsequently, at Step 12 the UE 205 obtains IP configuration information, including an IP address (see messaging 265).

At Steps 13, the UE 205 starts the establishment of an NWt connection with the TNGF address received in Step 8c (i.e., as part of the TNGF-sent access parameters, see block 267). First, at Step 13a, the UE 205 initiates an IKE procedure towards TNGF 213 by starting an IKE initial exchange according to RFC 7296. In Steps 8b and 8c, IKE_AUTH Request/Response messages are exchanged using the AUTH payload, which is derived based on the common TNGF key created in the UE 205 and in the AMF 221. Note that the UE 205 identity (5G-GUTI) received by TNGF 213 in step 13b (inside the IDi payload of the IKE signaling) indicates to the TNGF 213 which TNGF key should be used to authenticate the UE 205.

After the successful authentication in step 13c, a secure IPsec SA is created between the UE 205 and the TNGF 213. At Step 13d, the UE 205 establishes a TCP connection with TNGF 213 (as specified in TS 23.502), which completes the establishment of the NWt connection between the UE 205 and the TNGF 213.

At Step 14, after the NWt connection between the UE 205 and the TNGF 213 is established, the TNGF 213 responds to the AMF 221 with an Initial Context Setup Response message, indicating that a secure connection with the UE 205 has be established (see messaging 269). At Step 15, the AMF 221 sends a DL NAS Transport to the TNGF 213 containing a Registration Accept message for the UE 205. This message is forwarded to the UE 205 inside the established NWt connection (see messaging 271).

After the above signaling flow the UE 205 registration to 5G core network 220 via trusted non-3GPP access is completed and the established NWt connection is used to transfer further NAS messages between the UE 205 and the AMF 221.

The procedure 200 is based on the assumption that the UE 205 has registered with 5G core network 220 via 3GPP access (i.e., NG-RAN 215) and has established the 5G NAS security context 207, which is applied when the UE 205 attempts registration with 5G core network 220 via non-3GPP access (i.e., TNAN 210). If the UE 205 does not already have the 5G NAS security context 207 when attempting to register via non-3GPP access, then the registration procedure is modified as discussed below.

Figure 3:
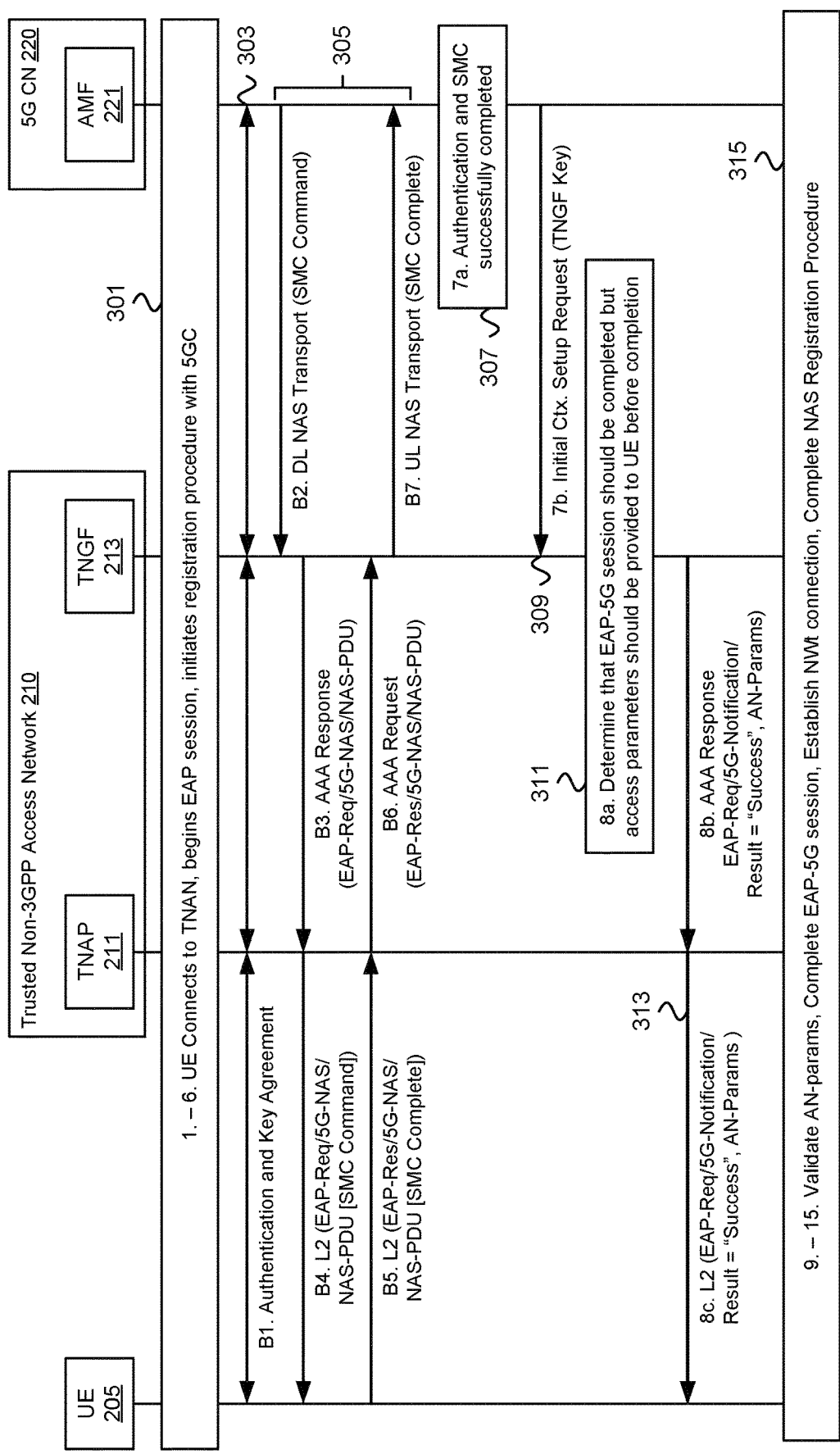
FIG. 3 is a signal flow diagram illustrating another embodiment of a notification procedure during 5G registration over a non-3GPP access network.

FIG. 3 depicts a procedure 300 for supporting a notification procedure during 5G registration over a non-3GPP access network, according to embodiments of the disclosure. The procedure 300 involves the UE 205, the TNGF 213 in the TNAN 210, and the AMF 221 in the 5G core network 220. The procedure 300 details signaling flow of a modified registration procedure for a scenario where a UE 205 initiates registration with the 5G core network 220 via a trusted non-3GPP access network but has not yet established a 5G-NAS security context when initiating the registration. Similar steps take place in other scenarios, e.g., when the UE 205 attempts to perform a Service Request, instead of a Registration Request. Note that the TNGF 213 does not send the access parameters to the UE 205 until it receives an indication from the AMF 221 (the TNGF key) that the EAP-5G session can be successfully completed Referring to FIG. 3, the procedure 300 begins as the UE 205 connects to the TNAP 211, begins an EAP session (i.e., an EAP-5G session) with the TNGF 213, and initiates the registration procedure with the 5G core network 220 (see block 301). Steps 1-6 of the procedure 300 are identical to Steps 1-6 of the procedure 200, discussed above with reference to FIG. 2A.

At Step B1, the UE 205 and AMF 221 perform a mutual authentication and key agreement procedure (see messaging 303). In Steps B2-B7, the AMF 221 initiates a Security Mode Control ("SMC") exchange with the UE 205 which creates a 5G NAS security context between the UE 205 and the AMF 221 (see messaging 305).

At Step 7*a*, the AMF 221 determines that the authentication and security mode control procedures are successfully completed (see block 307). Subsequently, at Step 7*b* the AMF 221 sends an Initial Context Setup Request to the TNGF 213 in order to enable the completion of the EAP-5G session (see messaging 309). This message includes a TNGF key, which should be used for establishing secure communication between the UE and the TNAN 210. As discussed above, instead of the Initial Context Setup Request, the AMF 221 may send a TNGF Relocation Command which contains the TNGF key and the IP address of a new TNGF to which the registration is relocated.

At Step 8*a*, because the TNGF 213 received a TNGF key, the TNGF 213 determines that the EAP-5G session is to be completed successfully and that the UE 205 is to receive access parameters before the completion of the EAP-5G session (see block 311). As above, the reception of the TNGF key in Step 7*b* triggers the TNGF 213 to send the access parameters. Note that in the procedure 300, the TNGF 213 does not send the access parameters to the UE 205 until it receives the indication from the AMF 221 (i.e., the TNGF key) that the EAP-5G session can be successfully completed.

Accordingly, in Steps 8*b* and 8*c* the TNGF 213 sends an EAP-Request/5G-Notification packet to the UE 205 that contains one or more access parameters and may also contain a result indication (e.g., Success or Failure) that indicates whether the EAP-5G session is successful or not (see messaging 313). Again, one or more of the access parameters may be cryptographically protected by the TNGF 213, as discussed above with reference to FIG. 2B.

The procedure 300 ends as the UE 205 validates the received access parameters, completes the EAP-5G session, establishes a NWt connection with the TNGF 213, and completes the NAS Registration procedure with the AMF 221 (see block 315). Steps 9-15 of the procedure 300 are identical to Steps 9-15 of the procedure 200, discussed above with reference to FIGS. 2B and 2C.

If the AMF 221 decides to reject the Registration Request from the UE 205, then (instead of the Initial Context Setup Request in Step 7*b*) the AMF 221 may send first a DL NAS Transport message to the TNGF 213 containing a Registration Reject message, which would be forward to the UE 205, and then sends a UE Context Release Command to the TNGF 213, which would be an indication that the EAP-5G session should be completed unsuccessfully, triggering the TNGF 213 to send an EAP-Failure message to the UE 205. However, before sending the EAP-Failure (in step 10), the TNGF 213 may send an EAP-Request/5G-Notification packet to the UE 205 providing access parameters that explain the reason of failure and/or access parameters that can be used to reattempt the registration.

Figure 4:
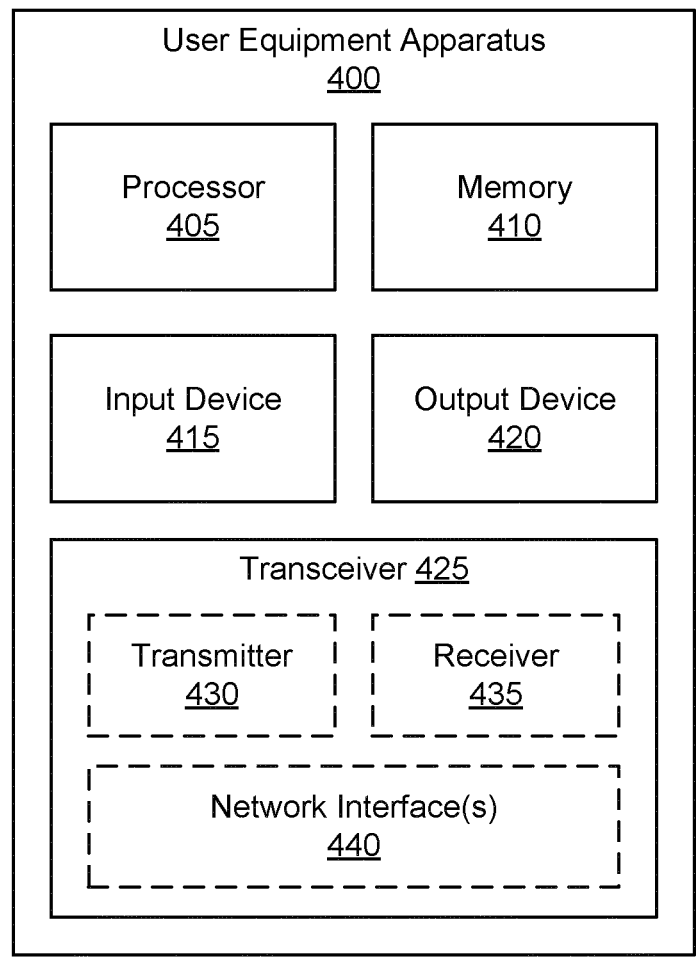
FIG. 4 is a block diagram illustrating one embodiment of a user equipment apparatus for supporting a notification procedure during 5G registration over a non-3GPP access network.

FIG. 4 depicts one embodiment of a user equipment apparatus 400 that may be used for supporting a notification procedure during 5G registration over a non-3GPP access network, according to embodiments of the disclosure. The user equipment apparatus 400 may be one embodiment of the remote unit 105 and/or the UE 205. Furthermore, the user equipment apparatus 400 may include a processor 405, a memory 410, an input device 415, an output device 420, a transceiver 425. In some embodiments, the input device 415 and the output device 420 are combined into a single device, such as a touch screen. In certain embodiments, the user equipment apparatus 400 does not include any input device 415 and/or output device 420.

As depicted, the transceiver 425 includes at least one transmitter 430 and at least one receiver 435. Here, the transceiver 425 communicates with a mobile core network (e.g., a 4GC) via an access network. Additionally, the transceiver 425 may support at least one network interface 440. Here, the at least one network interface 440 facilitates communication with an TNGF (e.g., using the "NWt" interface). Additionally, the at least one network interface 440 may include an interface used for communications with an AMF, an SMF, and/or a UPF.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 controls the user equipment apparatus 400 to implement the above described UE behaviors. In some embodiments, the processor 405 receives a message (see FIG. 2A, message 4*b*) that starts an EAP session (i.e., an EAP-5G session) with an access gateway in the TNAN (i.e., a TNGF). Here, the EAP session facilitates the establishment of a NAS signaling connection between the user equipment apparatus 400 and the mobile communication network and wherein the EAP session is used to encapsulate NAS messages exchanged between the user equipment apparatus 400 and an AMF in the mobile communication network. The processor 405 receives an EAP notification request from the access gateway before the EAP session is completed. Here, the EAP notification request including at least one access parameter. The processor 405 sends an EAP notification response and completes (i.e., closes/ends) the EAP session.

In some embodiments, the processor 405 establishes a secure IP connection (e.g., a NWt connection) with the access gateway using the at least one access parameter in response to completing the EAP session, and wherein the secure IP connection is used to transfer NAS messages between the user equipment apparatus 400 and the AMF after completing the EAP session. In some embodiments, the NAS signaling connection is used to register the user equipment apparatus 400 with the mobile communication network. In other embodiments, the NAS signaling connection may be used to carry a Service Request from the user equipment apparatus 400 to the network.

In some embodiments, the at least one access parameter includes at least one of: a TNGF address, a TNGF identity, a UE identity of the user equipment apparatus 400, and a selected cryptographic algorithm. In certain embodiments, the access gateway is a first TNGF in the TNAN, wherein the TNGF address includes one of: a first TNGF address of the first TNGF and a second TNGF address of a second TNGF in the TNAN.

In some embodiments, an access parameter is cryptographically protected (e.g., encrypted or integrity protected) using a TNGF key. For example, the TNGF key may be used with a pre-defined cryptographic algorithm to protect the access parameter. Alternatively, the TNGF key may be used with a cryptographic algorithm selected by the TNGF, as discussed below. In some embodiments, the EAP notification response indicates whether the user equipment apparatus 400 successfully received the at least one access parameter.

In some embodiments, the processor 405 sends a set of cryptographic algorithms supported by the user equipment apparatus 400 and receives a selected cryptographic algorithm, wherein the access gateway selects the selected cryptographic algorithm from the set of cryptographic algorithms. In such embodiments, the processor 405 validates (e.g., decrypts) an access parameter using the selected cryptographic algorithm and a TNGF key.

In certain embodiments, the selected cryptographic algorithm may be indicated in the EAP notification request. In certain embodiments, the processor 405 may indicate successful acceptance of the access parameters in response to successfully processing (e.g., validating and/or decrypting) the cryptographically protected at least one access parameter.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to supporting a notification procedure during 5G registration over a non-3GPP access network, for example storing security keys, IP addresses, and the like. In certain embodiments, the memory 410 also stores program code and related data, such as an operating system ("OS") or other controller algorithms operating on the user equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
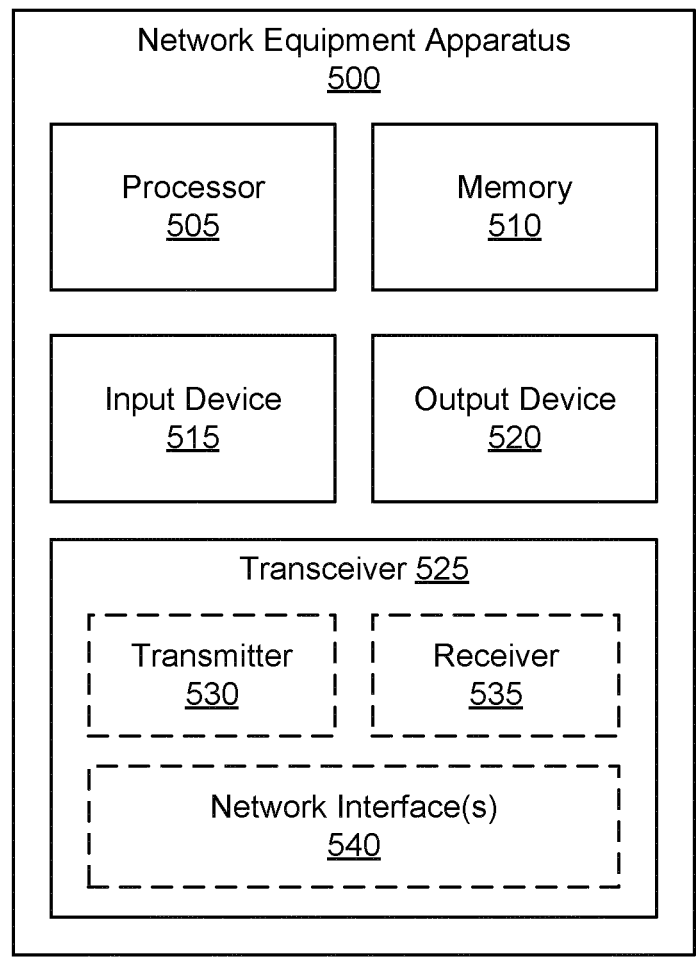
FIG. 5 is a block diagram illustrating one embodiment of a network equipment apparatus for supporting a notification procedure during 5G registration over a non-3GPP access network.

FIG. 5 depicts one embodiment of a network equipment apparatus 500 that may be used for supporting a notification procedure during 5G registration over a non-3GPP access network, according to embodiments of the disclosure. In some embodiments, the network equipment apparatus 500 may be one embodiment of a TNGF. In other embodiments, the network equipment apparatus 500 may be one embodiment of an AMF. Furthermore, network equipment apparatus 500 may include a processor 505, a memory 510, an input device 515, an output device 520, a transceiver 525. In some embodiments, the input device 515 and the output device 520 are combined into a single device, such as a touch screen. In certain embodiments, the network equipment apparatus 500 does not include any input device 515 and/or output device 520.

As depicted, the transceiver 525 includes at least one transmitter 530 and at least one receiver 535. Here, the transceiver 525 communicates with one or more remote units 105. Additionally, the transceiver 525 may support at least one network interface 540, such as the NWt, N2, and N3 interfaces depicted in FIG. 1. In some embodiments, the transceiver 525 supports a first interface for communicating with a RAN node, a second interface for communicating with one or more network functions in a mobile core network (e.g., a 5GC) and a third interface for communicating with a remote unit (e.g., UE).

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the processor 505 controls the network equipment apparatus 500 to implement the above described TNGF behaviors. In some embodiments, the processor 505 starts an EAP session (i.e., EAP-5G) with a UE (e.g., see FIG. 2A, message 4a). Here, the EAP session facilitates the establishment of a NAS signaling connection between the UE and the mobile communication network. The EAP session is used to encapsulate NAS messages exchanged between the UE and an AMF in the mobile communication network. The processor 505 receives a request from the AMF, wherein the request indicates that the EAP session is to be completed and determines whether the UE should receive at least one access parameter before the EAP session is completed. The processor 505 sends an EAP notification request to the UE in response to determining that the UE should receive the at least one access parameter before the EAP session is completed. Here, the EAP notification request including the at least one access parameter. The processor 505 receives an EAP notification response from the UE and completes (i.e., ends and/or closes) the EAP session.

In some embodiments, the processor 505 establishes a secure IP connection (e.g., NWt connection or IPsec connection) with the UE in response to completing the EAP session. In such embodiments, the secure IP connection is initiated by the UE by applying the at least one access parameter. Here, the secure IP connection is used to transfer NAS messages between the UE and the AMF after completing the EAP session. In certain embodiments, the NAS signaling connection is used to register the UE with the mobile communication network. In other embodiments, the NAS signaling connection may be used to carry a Service Request from the UE to the network.

While the NAS signaling connection is between the UE and the AMF, the NWt connection (e.g., an IPsec connection) is between the UE and TNGF. The NWt connection is used as a secure transport of the NAS messages between the UE and AMF, i.e., after the EAP session has ended. Note that before the establishment of the NWt connection, the NAS messages (i.e., between UE and AMF) are transferred via the EAP session (between UE and TNGF). However, after the establishment of the NWt connection (which occurs after the completion of the EAP session), the subsequent NAS messages are transferred via the NWt connection (between UE and TNGF).

In some embodiments, the request from the AMF does not contain a NAS message. In some embodiments, the request from the AMF is one of an Initial Context Setup Request and a TNGF Relocation Request, where the TNGF Relocation Request indicates that the NAS signaling connection should be established via a different TNGF.

In some embodiments, the request from the AMF indicates that the EAP session is to be successfully completed by including at least one of: a TNGF key and a TNGF address. In other embodiments, the request from the AMF indicates that the EAP session is to be unsuccessfully completed by including a UE CONTEXT RELEASE COMMAND.

In some embodiments, the at least one access parameter includes a TNGF address, a TNGF identity, a UE identity, and/or a selected cryptographic algorithm. In certain embodiments, the TNGF address is either a TNGF address received from AMF (i.e., in the case of TNGF relocation) or the address of the network equipment apparatus 500.

In some embodiments, an access parameter is cryptographically protected using a TNGF key. For example, the TNGF key may be used with a pre-defined cryptographic algorithm to protect the access parameter. Alternatively, the TNGF key may be used with a cryptographic algorithm selected by the network equipment apparatus 500, as discussed below. In certain embodiments, the EAP notification response indicates whether the UE successfully validated the cryptographically protected at least one access parameter.

In some embodiments, the processor 505 receives a set of cryptographic algorithms supported by the UE and selects a cryptographic algorithm from the set. In such embodiments, the processor 505 indicates the selected cryptographic algorithm to the UE, wherein the at least one access parameter is cryptographically protected using the selected cryptographic algorithm and a TNGF key. In certain embodiments, the processor 505 indicates the selected cryptographic algorithm in the EAP notification request. In other embodiments, the processor 505 indicates the selected cryptographic algorithm in separate signaling.

In some embodiments, the EAP notification response indicates whether the UE successfully received the at least one access parameter. In some embodiments, the processor 505 completes the EAP session by sending an EAP-Success packet when the EAP notification response indicates that the UE has successfully accepted the access parameters. In some embodiments, the EAP session is completed by sending an EAP-Failure packet when the EAP notification response indicates that the UE did not successfully receive the at least one access parameter.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to supporting a notification procedure during 5G registration over a non-3GPP access network, for example storing security keys, IP addresses, UE contexts, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
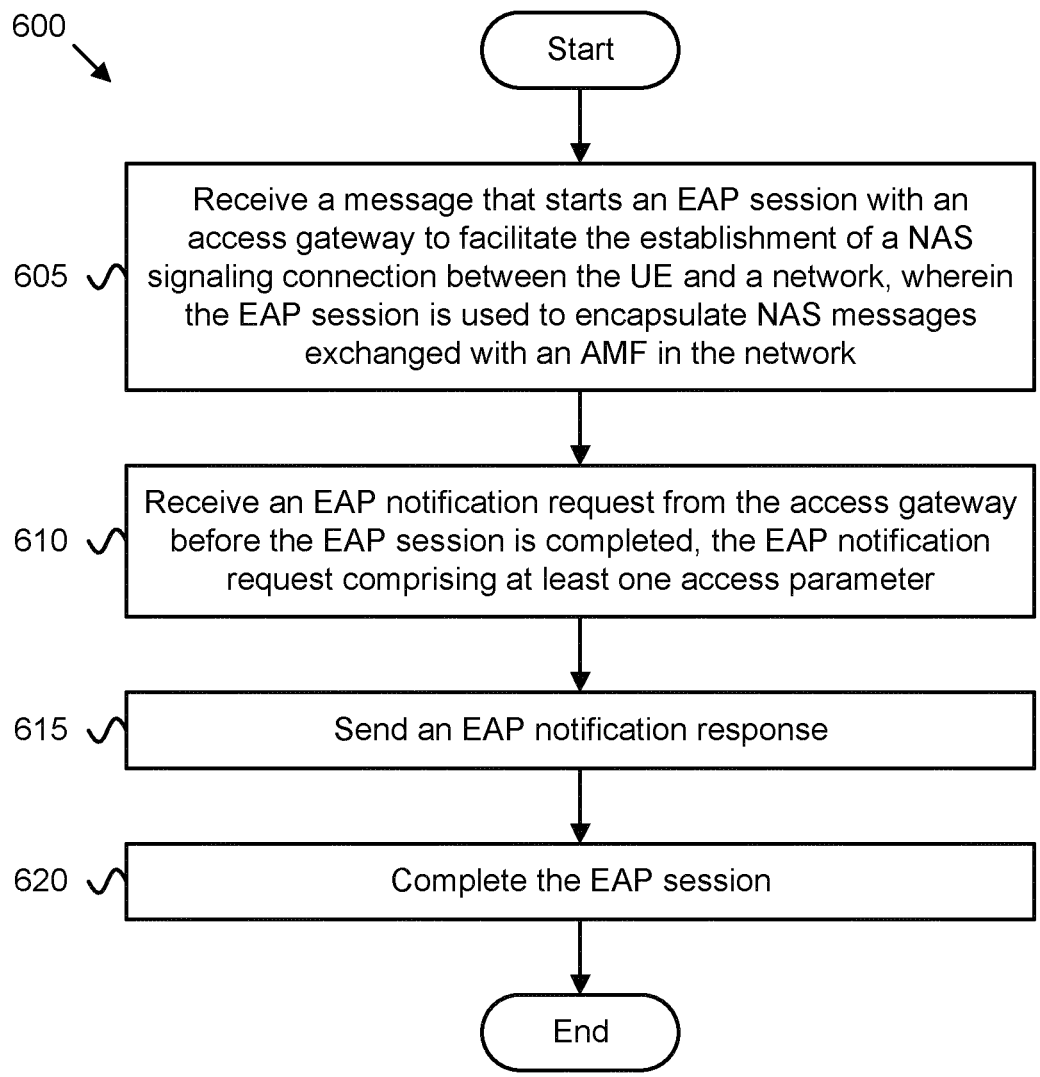
FIG. 6 is a flow chart diagram illustrating one embodiment of a first method for supporting a notification procedure during 5G registration over a non-3GPP access network.

FIG. 6 depicts one embodiment of a method 600 for supporting a notification procedure during 5G registration over a non-3GPP access network, according to embodiments of the disclosure. In various embodiments, the method 600 is performed by a UE, such as the remote unit 105, the UE 205, and/or the user equipment apparatus 400, described above. In some embodiments, the method 600 is performed by a processor, such as a microcontroller, a microprocessor, a CPU, a GPU, an auxiliary processing unit, a FPGA, or the like.

The method 600 begins and receives 605 a message that starts an EAP session with an access gateway in a TNAN. Here, the EAP session facilitates the establishment of a NAS signaling connection between the UE and the mobile communication network. The EAP session is used to encapsulate NAS messages exchanged between the UE and an AMF in the mobile communication network. The method 600 includes receiving 610 an EAP notification request from the access gateway before the EAP session is completed. Here, the EAP notification request includes at least one access parameter. The method 600 includes sending 615 an EAP notification response. The method 600 includes completing 620 (i.e., ending or closing) the EAP session. The method 600 ends.

Figure 7:
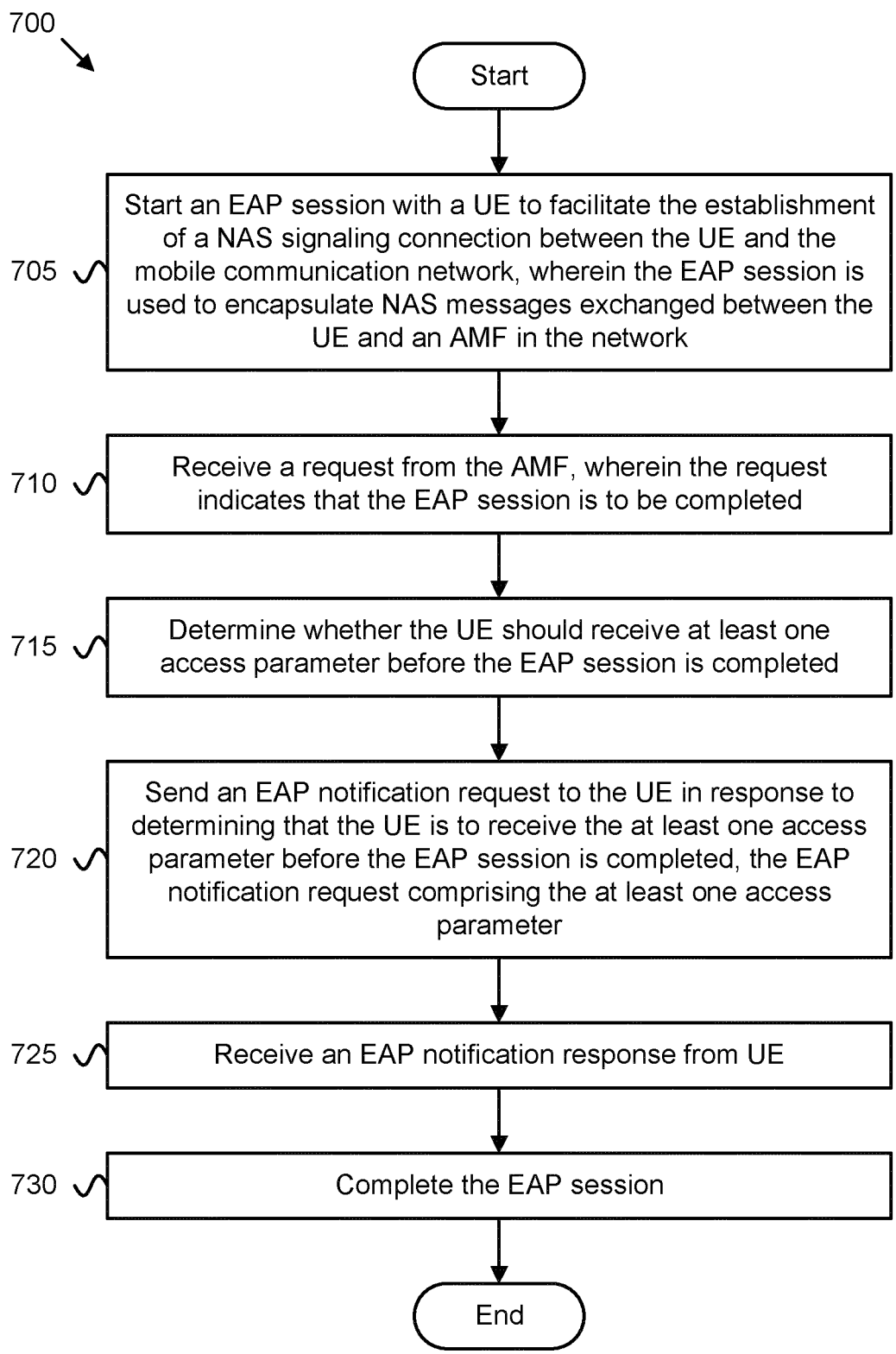
FIG. 7 is a flow chart diagram illustrating one embodiment of a second method for supporting a notification procedure during 5G registration over a non-3GPP access network.

FIG. 7 depicts one embodiment of a method 700 for supporting a notification procedure during 5G registration over a non-3GPP access network, according to embodiments of the disclosure. In various embodiments, the method 700 is performed by a TNGF, such as the TNGF 125, TNGF 127, TNGF 213, and/or network equipment apparatus 500, described above. In some embodiments, the method 700 is performed by a processor, such as a microcontroller, a microprocessor, a CPU, a GPU, an auxiliary processing unit, a FPGA, or the like.

The method 700 begins and starts 705 an EAP session with a UE. Here, the EAP session facilitates the establishment of a NAS signaling connection between the UE and the mobile communication network. The EAP session is used to encapsulate NAS messages exchanged between the UE and an AMF in the mobile communication network.

The method 700 includes receiving 710 a request from the AMF. Here, the request indicates that the EAP session is to be completed. The method 700 includes determining 715 whether the UE is to receive at least one access parameter before the EAP session is completed.

The method 700 includes sending 720 an EAP notification request to the UE in response to determining that the UE is to receive the at least one access parameter before the EAP session is completed. Here, the EAP notification request includes the at least one access parameter. The method 700 includes receiving 725 an EAP notification response from the UE. The method 700 includes completing 730 (i.e., ending or closing) the EAP session. The method 700 ends.

Disclosed herein is a first apparatus for supporting a notification procedure during 5G registration over a non-3GPP access network, according to embodiments of the disclosure. The first apparatus may be implemented by a TNGF, such as the TNGF 125, TNGF 127, TNGF 213, and/or network equipment apparatus 500, described above. The first apparatus includes a network interface that communicates with a mobile communication network and a processor that starts an EAP session (i.e., EAP-5G) with a UE. Here, the EAP session facilitates the establishment of a NAS signaling connection between the UE and the mobile communication network. The EAP session is used to encapsulate NAS messages exchanged between the UE and an AMF in the mobile communication network. The processor receives a request from the AMF, wherein the request indicates that the EAP session is to be completed and determines whether the UE should receive at least one access parameter before the EAP session is completed. The processor sends an EAP notification request to the UE in response to determining that the UE should receive the at least one access parameter before the EAP session is completed. Here, the EAP notification request including the at least one access parameter. The processor receives an EAP notification response from the UE and completes (i.e., ends/closes) the EAP session.

In some embodiments, the processor establishes a secure IP connection (e.g., NWt connection or IPsec connection) with the UE in response to completing the EAP session. In such embodiments, the secure IP connection is initiated by the UE by applying the at least one access parameter. Here, the secure IP connection is used to transfer NAS messages between the UE and the AMF after completing the EAP session. In certain embodiments, the NAS signaling connection is used to register the UE with the mobile communication network. In other embodiments, the NAS signaling connection may be used to carry a Service Request from the UE to the network.

In some embodiments, the request from the AMF does not contain a NAS message. In some embodiments, the request from the AMF is one of an Initial Context Setup Request and a TNGF Relocation Request, where the TNGF Relocation Request indicates that the NAS signaling connection should be established via a different TNGF.

In some embodiments, the request from the AMF indicates that the EAP session is to be successfully completed by including at least one of: a TNGF key and a TNGF address. In other embodiments, the request from the AMF indicates that the EAP session is to be unsuccessfully completed by including a UE CONTEXT RELEASE COMMAND.

In some embodiments, the at least one access parameter includes a TNGF address, a TNGF identity, a UE identity, and/or a selected cryptographic algorithm. In certain embodiments, the TNGF address is either a TNGF address received from AMF (i.e., in the case of TNGF relocation) or the address of the first apparatus.

In some embodiments, an access parameter is cryptographically protected using a TNGF key. For example, the TNGF key may be used with a pre-defined cryptographic algorithm to protect the access parameter. Alternatively, the TNGF key may be used with a cryptographic algorithm selected by the first apparatus, as discussed below. In certain embodiments, the EAP notification response indicates whether the UE successfully validated the cryptographically protected at least one access parameter.

In some embodiments, the processor receives a set of cryptographic algorithms supported by the UE and selects a cryptographic algorithm from the set. In such embodiments, the processor indicates the selected cryptographic algorithm to the UE, wherein the at least one access parameter is cryptographically protected using the selected cryptographic algorithm and a TNGF key. In certain embodiments, the processor indicates the selected cryptographic algorithm in the EAP notification request.

In some embodiments, the EAP notification response indicates whether the UE successfully received the at least one access parameter. In some embodiments, the processor completes the EAP session by sending an EAP-Success packet when the EAP notification response indicates that the UE has successfully accepted the access parameters. In some embodiments, the EAP session is completed by sending an EAP-Failure packet when the EAP notification response indicates that the UE did not successfully receive the at least one access parameter.

Disclosed herein is a first method for supporting a notification procedure during 5G registration over a non-3GPP access network, according to embodiments of the disclosure. The first method may be performed by a TNGF, such as the TNGF 125, TNGF 127, TNGF 213, and/or network equipment apparatus 500, described above. The first method includes starting an EAP session (i.e., an EAP-5G session) with a UE. Here, the EAP session facilitates the establishment of a NAS signaling connection between the UE and the mobile communication network. The EAP session is used to encapsulate NAS messages exchanged between the UE and an AMF in the mobile communication network. The first method includes receiving a request from the AMF. Here, the request indicates that the EAP session is to be completed. The first method includes determining whether the UE is to receive at least one access parameter before the EAP session is completed. The first method includes sending an EAP notification request to the UE in response to determining that the UE is to receive the at least one access parameter before the EAP session is completed. Here, the EAP notification request includes the at least one access parameter. The first method includes receiving an EAP notification response from the UE. The first method includes completing (i.e., ending/closing) the EAP session.

In some embodiments, the first method includes establishing a secure IP connection (e.g., NWt connection or IPsec connection) with the UE in response to completing the EAP session. In such embodiments, the secure IP connection is initiated by the UE by applying the at least one access parameter. Here, the secure IP connection is used to transfer NAS messages between the UE and the AMF after completing the EAP session. In certain embodiments, the NAS signaling connection is used to register the UE with the mobile communication network. In other embodiments, the NAS signaling connection may be used to carry a Service Request from the UE to the network.

In some embodiments, the request from the AMF does not contain a NAS message. In some embodiments, the request from the AMF is one of an Initial Context Setup Request and a TNGF Relocation Request, where the TNGF Relocation Request indicates that the NAS signaling connection should be established via a different TNGF.

In some embodiments, the request from the AMF indicates that the EAP session is to be successfully completed by including at least one of: a TNGF key and a TNGF address. In other embodiments, the request from the AMF indicates that the EAP session is to be unsuccessfully completed by including a UE CONTEXT RELEASE COMMAND.

In some embodiments, the at least one access parameter includes a TNGF address, a TNGF identity, a UE identity, and/or a selected cryptographic algorithm. In certain embodiments, the TNGF address is either a TNGF address received from AMF (i.e., in the case of TNGF relocation) or the address of the TNGF.

In some embodiments, an access parameter is cryptographically protected using a TNGF key. For example, the TNGF key may be used with a pre-defined cryptographic algorithm to protect the access parameter. Alternatively, the TNGF key may be used with a cryptographic algorithm selected by the TNGF, as discussed below. In certain embodiments, the EAP notification response indicates whether the UE successfully validated the cryptographically protected at least one access parameter.

In some embodiments, the first method includes receiving a set of cryptographic algorithms supported by the UE and selecting a cryptographic algorithm from the set. In such embodiments, the first method includes indicating the selected cryptographic algorithm to the UE, wherein the at least one access parameter is cryptographically protected using the selected cryptographic algorithm and a TNGF key. In certain embodiments, the first method includes indicating the selected cryptographic algorithm in the EAP notification request. In other embodiments, the first method includes indicating the selected cryptographic algorithm in separate signaling.

In some embodiments, the EAP notification response indicates whether the UE successfully received the at least one access parameter. In some embodiments, the first method includes completing the EAP session by sending an EAP-Success packet when the EAP notification response indicates that the UE has successfully accepted the access parameters. In some embodiments, the EAP session is completed by sending an EAP-Failure packet when the EAP notification response indicates that the UE did not successfully receive the at least one access parameter.

Disclosed herein is a second apparatus for supporting a notification procedure during 5G registration over a non-3GPP access network, according to embodiments of the disclosure. The second apparatus may be implemented by a UE, such as the remote unit 105, the UE 205, and/or the user equipment apparatus 400, described above. The second apparatus includes a transceiver that communicates with a mobile communication network via a TNAN and a processor that receives a message that starts an EAP session (i.e., an EAP-5G session) with an access gateway in the TNAN (i.e., a TNGF). Here, the EAP session facilitates the establishment of a NAS signaling connection between the second apparatus and the mobile communication network and wherein the EAP session is used to encapsulate NAS messages exchanged between the second apparatus and an AMF in the mobile communication network. The processor receives an EAP notification request from the access gateway before the EAP session is completed. Here, the EAP notification request including at least one access parameter. The processor sends an EAP notification response and completes (i.e., closes/ends) the EAP session.

In some embodiments, the processor establishes a secure IP connection (e.g., a NWt connection) with the access gateway using the at least one access parameter in response to completing the EAP session, and wherein the secure IP connection is used to transfer NAS messages between the second apparatus and the AMF after completing the EAP session. In some embodiments, the NAS signaling connection is used to register the second apparatus with the mobile communication network. In other embodiments, the NAS signaling connection may be used to carry a Service Request from the second apparatus to the network.

In some embodiments, the at least one access parameter includes at least one of: a TNGF address, a TNGF identity, a network identity of the second apparatus, and a selected cryptographic algorithm. In certain embodiments, the access gateway is a first TNGF in the TNAN, wherein the TNGF address includes one of: a first TNGF address of the first TNGF and a second TNGF address of a second TNGF in the TNAN.

In some embodiments, an access parameter is cryptographically protected (e.g., encrypted or integrity protected) using a TNGF key. For example, the TNGF key may be used with a pre-defined cryptographic algorithm to protect the access parameter. Alternatively, the TNGF key may be used with a cryptographic algorithm selected by the TNGF, as discussed below. In some embodiments, the EAP notification response indicates whether the second apparatus successfully received the at least one access parameter.

In some embodiments, the processor sends a set of cryptographic algorithms supported by the second apparatus and receives a selected cryptographic algorithm, wherein the access gateway selects the selected cryptographic algorithm from the set of cryptographic algorithms. In such embodiments, the processor validates (e.g., decrypts) an access parameter using the selected cryptographic algorithm and a TNGF key.

In certain embodiments, the selected cryptographic algorithm may be indicated in the EAP notification request. In certain embodiments, the processor may indicate successful acceptance of the access parameters in response to successfully processing (e.g., validating and/or decrypting) the cryptographically protected at least one access parameter.

Disclosed herein is a second method for supporting a notification procedure during 5G registration over a non-3GPP access network, according to embodiments of the disclosure. The second method may be implemented by a UE, such as the remote unit 105, the UE 205, and/or the user equipment apparatus 400, described above. The second method includes receiving a message that starts an EAP session (i.e., an EAP-5G session) with an access gateway in the TNAN (i.e., a TNGF). Here, the EAP session facilitates the establishment of a NAS signaling connection between the UE and the mobile communication network. The EAP session is used to encapsulate NAS messages exchanged between the UE and an AMF in the mobile communication network. The second method includes receiving an EAP notification request from the access gateway before the EAP session is completed. Here, the EAP notification request includes at least one access parameter. The second method includes sending an EAP notification response. The second method includes completing (i.e., ending/closing) the EAP session.

In some embodiments, the second method includes establishing a secure IP connection (e.g., a NWt connection) with the access gateway using the at least one access parameter in response to completing the EAP session, and wherein the secure IP connection is used to transfer NAS messages between the UE and the AMF after completing the EAP session. In some embodiments, the NAS signaling connection is used to register the UE with the mobile communication network. In other embodiments, the NAS signaling connection is used to carry a Service Request from the UE to the network.

In some embodiments, the at least one access parameter includes at least one of: a TNGF address, a TNGF identity, a UE identity, and a selected cryptographic algorithm. In certain embodiments, the access gateway is a first TNGF in the TNAN, wherein the TNGF address includes one of: a first TNGF address of the first TNGF and a second TNGF address of a second TNGF in the TNAN.

In some embodiments, an access parameter is cryptographically protected (e.g., encrypted or integrity protected) using a TNGF key. For example, the TNGF key may be used with a pre-defined cryptographic algorithm to protect the access parameter. Alternatively, the TNGF key may be used with a cryptographic algorithm selected by the TNGF, as discussed below. In some embodiments, the EAP notification response indicates whether the UE successfully received the at least one access parameter.

In some embodiments, the second method includes sending a set of cryptographic algorithms supported by the UE and receiving a selected cryptographic algorithm, wherein the access gateway selects the selected cryptographic algorithm from the set of cryptographic algorithms. In such embodiments, the second method includes processing (e.g., validating and/or decrypting) an access parameter using the selected cryptographic algorithm and a TNGF key.

In certain embodiments, the selected cryptographic algorithm may be indicated in the EAP notification request. In certain embodiments, the second method may include indicating successful acceptance of the access parameters in response to successfully processing (e.g., validating and/or decrypting) the cryptographically protected at least one access parameter.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus storing code for a gateway function, the apparatus comprising:
at least one memory storing the code; and
at least one processor coupled with the at least one memory and configured to execute the code to cause the gateway function to:
start an Extensible Authentication Protocol ("EAP") session with a user equipment ("UE"), wherein the gateway function supports exchange of a first set of Non-Access Stratum ("NAS") messages exchanged between the UE and an access and mobility management function ("AMF");
receive, from the AMF, a first request comprising a security key for securing a communication with the UE;
transmit an EAP notification request to the UE in response to receiving the first request comprising the security key, wherein the EAP notification request comprises at least one access parameter;
receive an EAP notification response from the UE; and
complete the EAP session.

2. The apparatus of claim 1, wherein the at least one processor is configured to cause the gateway function to establish a secure Internet Protocol ("IP") connection with the UE in response to completing the EAP session, wherein the secure IP connection is based on the at least one access parameter, and wherein the secure IP connection is used to transfer a second set of NAS messages between the UE and the AMF after completing the EAP session.

3. The apparatus of claim 1, wherein the at least one processor is configured to cause the gateway function to:
establish a NAS signaling connection; and
register the UE with the a network.

4. The apparatus of claim 1, wherein the first request lacks a NAS message.

5. The apparatus of claim 1, wherein the first request is an Initial Context Setup Request or a Trusted Non-3GPP Gateway Function ("TNGF") Relocation Request, where the TNGF Relocation Request comprises an indication to establish a NAS signaling connection via a different TNGF.

6. The apparatus of claim 1, wherein the first request comprises a Trusted Non-3GPP Gateway Function ("TNGF") key or a TNGF address, or both, for indicating that the EAP session is to be successfully completed.

7. The apparatus of claim 1, wherein the first request comprises a UE CONTEXT RELEASE COMMAND for indicating that the EAP session is to be unsuccessfully completed.

8. The apparatus of claim 1,
wherein the at least one access parameter comprises one or more of: a Trusted Non-3GPP Gateway Function ("TNGF") address, a TNGF identity, a UE identity, or a selected cryptographic algorithm, or a combination thereof, and
wherein the TNGF address comprises a TNGF address received from the AMF or an address of the apparatus, or both.

9. The apparatus of claim 1, wherein the security key comprises a Trusted Non-3GPP Gateway Function ("TNGF") key, wherein the at least one access parameter is cryptographically protected using the TNGF key, and wherein the EAP notification response indicates whether the UE successfully validated the at least one access parameter.

10. The apparatus of claim 1, wherein the at least one processor is further configured to cause the gateway function to:
receive an indication of a set of cryptographic algorithms supported by the UE;
select a cryptographic algorithm from the set of cryptographic algorithms; and
transmit an indication of the selected cryptographic algorithm to the UE, wherein the at least one access parameter is cryptographically protected using the selected cryptographic algorithm and the security key, wherein the security key comprises a Trusted Non-3GPP Gateway Function ("TNGF") key.

11. The apparatus of claim 1, wherein the EAP notification response indicates whether the UE successfully received the at least one access parameter.

12. The apparatus of claim 1, wherein the at least one processor is configured to cause the gateway function to complete the EAP session by sending an EAP-Success packet when the EAP notification response indicates that the UE has successfully accepted the at least one access parameter or sending an EAP-Failure packet when the EAP notification response indicates that the UE did not successfully receive the at least one access parameter.

13. A method performed by a gateway function, the method comprising:
- starting an Extensible Authentication Protocol ("EAP") session with a user equipment ("UE"), wherein the the gateway function supports exchange of Non-Access Stratum ("NAS") messages between the UE and an access and mobility management function ("AMF");
- receiving, from the AMF, a first request comprising a security key for securing a communication with the UE;
- transmitting an EAP notification request to the UE in response to receiving the first request comprising the security key, wherein the EAP notification request comprises at least one access parameter;
- receiving an EAP notification response from the UE; and
- completing the EAP session.

14. A user equipment ("UE") comprising:
- at least one memory; and
- at least one processor coupled with the at least one memory and configured to cayuse the UE to:
- receive a message that starts an Extensible Authentication Protocol ("EAP") session with an access gateway in a trusted non-3GPP access network ("TNAN"), wherein the UE supports exchange of a first set of Non-Access Stratum ("NAS") messages exchanged between the UE and an access and mobility management function ("AMF");
- receive an EAP notification request from the access gateway before the EAP session is completed, the EAP notification request comprising at least one access parameter;
- transmit an EAP notification response; and
- complete the EAP session.

15. The UE of claim 14, wherein the at least one processor is configured to cause the UE to establish a secure Internet Protocol ("IP") connection with the access gateway using the at least one access parameter in response to completing the EAP session, and wherein the secure IP connection is used to transfer a second set of NAS messages between the UE and the AMF after completing the EAP session.

16. The UE of claim 14, wherein the at least one processor is configured to cause the UE to:
- establish a NAS signaling connection; and
- register the UE with a network.

17. The UE of claim 14, wherein the EAP notification response indicates whether the UE successfully received the at least one access parameter, wherein the at least one access parameter comprises one or more of: a Trusted Non-3GPP Gateway Function ("TNGF") address, a TNGF identity, a network identity of the UE, or a selected cryptographic algorithm, or a combination thereof.

18. The UE of claim 14, wherein the at least one processor is further configured to cause the UE to:
- indicate a set of cryptographic algorithms supported by the UE,
- receive an indication of a selected cryptographic algorithm, wherein the access gateway selects the selected cryptographic algorithm from the set of cryptographic algorithms,
- validate the at least one access parameter using the selected cryptographic algorithm and a Trusted Non-3GPP Gateway Function ("TNGF") key, and
- transmit an indication of a successful acceptance of the at least one access parameter in response to a successful validation of at least one access parameter.

19. The UE of claim 18, wherein the EAP notification request comprises an indication of the selected cryptographic algorithm.

20. A method performed by a user equipment ("UE"), the method comprising:
- receiving a message that starts an Extensible Authentication Protocol ("EAP") session with an access gateway in a trusted non-3GPP access network ("TNAN") TNAN, wherein the EAP session is used to encapsulates Non-Access Stratum ("NAS") messages exchanged between the UE and an access and mobility management function ("AMF") in the mobile communication network;
- receiving an EAP notification request from the access gateway before the EAP session is completed, the EAP notification request comprising at least one access parameter;
- sending an EAP notification response; and
- completing the EAP session.

* * * * *